United States Patent Office 3,014,976
Patented Dec. 26, 1961

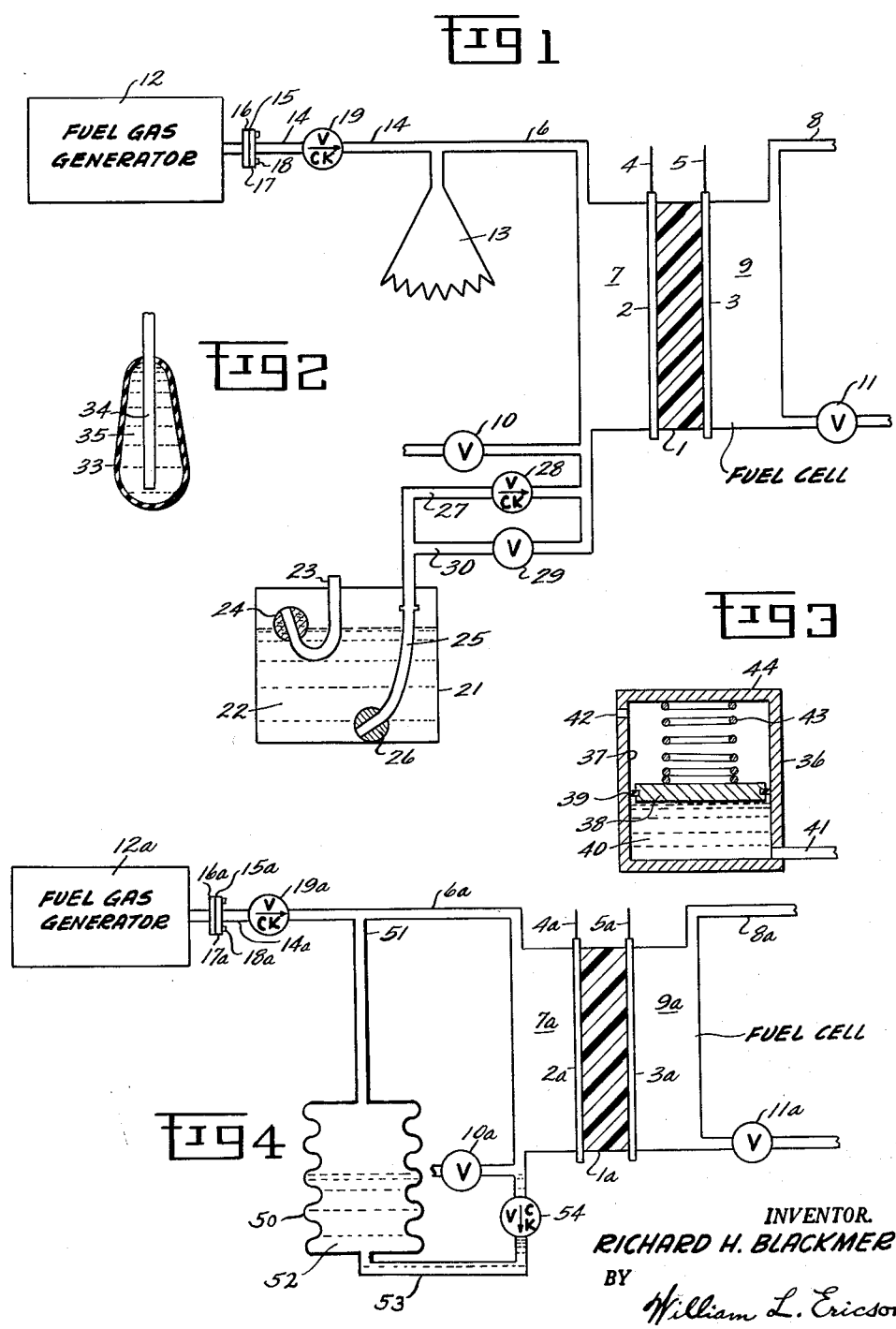

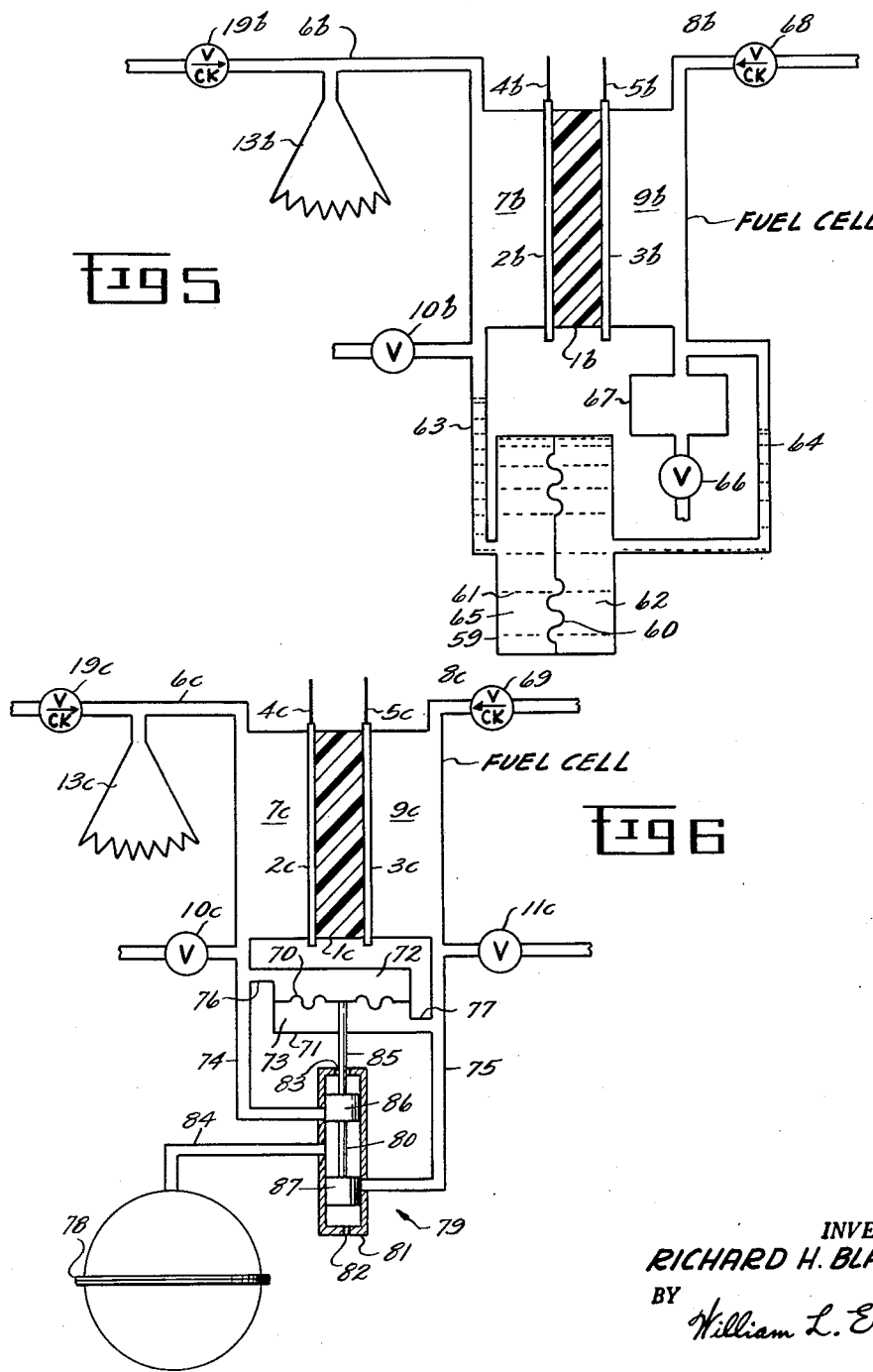

3,014,976
FUEL CELL SYSTEM WITH MEANS FOR PREVENTION OF DAMAGE BY DIFFERENTIAL GAS PRESSURES
Richard Hardin Blackmer, Topsfield, Mass., assignor to General Electric Company, a corporation of New York
Filed Feb. 29, 1960, Ser. No. 11,697
8 Claims. (Cl. 136—86)

This invention relates to fuel cell systems, and more particularly to an improved fuel cell system with means for prevention of damage by gas pressure. The invention is particularly applicable to systems utilizing fuel cells of the type shown and described by U.S. Patent No. 2,913,511 to Willard T. Grubb, Jr., issued November 17, 1959, and assigned to the assignee of this application.

A fuel cell having a solid ion exchange electrolyte membrane is disclosed by the aforementioned Grubb patent, and this type of cell will hereinafter be referred to as a solid electrolyte fuel cell. According to the patent, an ion exchange resin membrane is placed between and in contact with a pair of permeable electrodes having catalytic properties, which are exposed to reactants comprising an oxidant and a fuel gas, for example, hydrogen. Ionization of one of the reactants occurs at one of the electrodes; electrons migrate between the electrically-connected electrodes to establish an electric current output, and the ions migrate through the membrane to combine with the other reactant at the second electrode.

In the operation of solid electrolyte fuel cells, it is necessary to furnish a continuing supply of fuel gas and oxidant (e.g., air) to the cell. It has been found that chemical generators and pressure reservoirs, or a combination of both of these sources arranged in serial flow relation, are convenient sources of supply of the fuel gas, and also of various oxidants other than air, where such oxidants are utilized. Either of these sources must be replenished from time to time, although a combination of both permits continued operation of the fuel cell while the generator is removed from the system for replenishment of the gas-generating chemicals.

However, in the event that the gas supply is not replenished, and the electrical connection of the electrodes is not interrupted, I have found that the fuel cell will continue to operate until the gas pressure reaches a very low sub-atmospheric level at the corresponding electrode. A substantial pressure differential on opposite sides of the ion exchange membrane will result if the other of the operating gases remains at a normal, relatively high pressure level. The probability of such an occurrence is substantial, particularly in applications of fuel cells to remote or unattended power stations, and to portable power supplies.

The ion exchange membranes employed in solid electrolyte fuel cells, examples of which are described by the aforementioned Grubb patent, possess very limited bursting strength. While their thickness is not critical to cell operation, and may vary from several mills up to a quarter of an inch or more, they are preferably made as thin as possible for economic reasons, and to achieve maximum volumetric efficiency of the cell. Thicknesses from 20 to 30 mils have been used satisfactorily.

However, the occurrence of a large pressure differential on opposite sides of the membranes, resulting from exhaustion of one of the reactant gases, can easily burst a thin ion exchange membrane. Not only does this interfere with operation of the fuel cell to produce electricity, but the ensuing direct contact of the oxidant and fuel gases in the presence of the catalytic electrodes results in local or general combustion.

It is the object of this invention to provide a fuel cell system with means for preventing the occurrence of such a differential gas pressure on opposite sides of an ion exchange membrane thereof, as would cause bursting of the membrane.

It is a further object of this invention to provide a fuel cell system with means for automatic interruption of cell operation upon the depletion of one of the reactant gases, to prevent bursting of an ion exchange membrane of the cell by differential pressure of the reactant gases.

These and other objects and advantages of my invention will become apparent as the following description proceeds.

Briefly stated, in accordance with one embodiment thereof, I carry out my invention by providing a fuel cell system with a fluid reservoir containing a non-reactant fluid. The reservoir communicates with at least one of two reactant gas chambers of the cell, which enclose the two major surfaces of an ion exchange membrane. Means are provided to cause the non-reactant fluid to flood the chamber upon the depletion of the reactant gas in the chamber to a pressure below a reference level. The non-reactant fluid may be liquid or gaseous. The reference pressure may be established in various ways, at such a level as to cause flooding of the fuel cell chamber with non-reactant fluid prior to the development of a dangerous pressure differential upon the membrane by depletion of the reactant gas. Means are provided to drain the flooded chamber of non-reactant fluid upon replenishment of the reactant gas supply, for re-establishing normal operation of the fuel cell.

While the specification concludes with claims particularly pointing out and distinctly claiming the subject matter which I regard as my invention, it is believed that the invention will be better understood from the following description taken in connection with the accompanying drawings, in which:

FIG. 1 is a schematic representation of a solid electrolyte fuel cell system incorporating a preferred embodiment of my invention, in which a liquid is used as a non-reactant fluid, and the reference pressure is atmospheric;

FIG. 2 is an elevation in section of a modification of the fluid reservoir of FIG. 1, adapted for use with liquid or gaseous non-reactant fluid;

FIG. 3 is an elevation in section of a further modification of the fluid reservoir of FIG. 1, providing a super-atmospheric reference pressure;

FIG. 4 is a schematic representation of a fuel cell system incorporating a further embodiment of my invention, in which a non-reactant fluid reservoir is integrally combined with a surge tank in an expansible container;

FIG. 5 is a schematic representation of another embodiment of my invention, in which flooding of either fuel or oxidant gas chambers is regulated by the differential of their pressures; and FIG. 6 is a schematic representation of still another embodiment of my invention, in which chamber flooding by a pressurized non-reactant gas is regulated by the differential pressure of fuel and oxidant gas chambers.

Referring to FIG. 1, a fuel cell made according to the aforementioned Grubb Patent No. 2,913,511 is provided, comprising an ion exchange membrane 1 positioned between and in electrical contact with terminal grids 2 and 3. Leads 4 and 5 connected to grids 2 and 3, respectively, are used to deliver electrical current to apparatus supplied by the cell. Gas-permeable catalytic electrodes are provided over the major surfaces of membrane 1, and may be integral with the terminal grids, or may alternatively be integrally bonded with the membrane, as described in copending application Serial No. 850,589 of Leonard W. Niedrach, filed November 3, 1959, and assigned to the assignee of the present application. Fuel gas is supplied to grid 3 and membrane 1 through conduit means 6 and chamber 7. A valved outlet 10 is provided from chamber 7 to exhaust any impurities which enter the chamber from the fuel gas or any inert materials which are a product of reaction of the fuel gas. The reactant oxidant gas, which may be oxygen or air, is admitted into chamber 9 through conduit means 8. A valved outlet 11 is provided from chamber 9 to exhaust inert gases and products of reaction of the oxidant gas. The construction and operation of the fuel cell is as described in the aforementioned Grubb patent, and further detailed description is not believed necessary.

Any desired sources of fuel gas and oxidant may be used to supply the fuel cell; by way of illustration, however, chamber 9 is supplied with atmospheric air through conduit 8, and chamber 7 is supplied with fuel gas from a generator generally designated 12, through conduit means 6. Generator 12 comprises any well-known means for mixing fuel gas-generating reactants. For example, hydrogen gas may be liberated from hydride or borohydride materials by mixing an aqueous solution with them at a controlled rate.

In the system shown in FIG. 1, a surge tank 13, comprising a conventional expansible bellows, is placed in serial flow relation between generator 12 and conduit means 6 by means of a conduit 14, to provide fuel gas storage for temporarily continuing operation of the fuel cell when the fuel-gas generating reactants require replenishment. Tank 13 also serves to modify variations in gas pressure which result from a normally irregular reaction rate of the generator.

Removal of generator 12 to facilitate replenishment of reactants is provided for by an interruption 15 in conduit 14, normally coupled in fluid-sealing engagement by means of flanges 16 and 17 formed about the interruption. Flanges 16 and 17 are coupled by machine screws 18 threaded therein, or by any conventional fastening means which may be readily removed. In order to prevent reverse flow of fuel gas from tank 13 to the atmosphere upon removal of generator 12, a conventional check valve 19 is placed in serial flow relation in conduit 14, and limits flow to the direction shown by the arrow.

In the event that the gas-generating reactants in generator 12 are not replenished when exhausted, the fuel cell tends to continue to operate until the fuel gas pressure in chamber 7 reaches a low subatmospheric level. Since the pressure of the air in chamber 9 remains atmospheric, membrane 1 would then be subjected to a pressure differential in the order of one atmosphere. A pressure differential of this magnitude may burst known ion exchange membranes of the preferred range of thicknesses, that is, about 2 to 30 mils. Resulting contact of the reactant gases in the presence of catalytic electrodes 2 and 3 would interfere with generation of electricity by the fuel cell, coupled with local or general combustion.

In order to prevent the occurrence of catastrophic bursting of the membrane, I provide means for flooding chamber 7 with a non-reactant fluid when the fuel gas pressure therein falls below a reference level. In the system of FIG. 1, these means comprise a reservoir 21, containing a supply of non-reactant liquid 22. While any liquid which will not react in the fuel cell may be used in the system shown, I prefer to utilize water. Dehydration of membrane 1 is minimized while chamber 7 is flooded with water, with the result that deterioration during a period of inoperation is prevented.

Atmospheric pressure is used as a reference level in the system of FIG. 1, and for this purpose the supply of liquid 22 is exposed to the atmosphere through a tube 23, extending into reservoir 21. A float 24 of any suitable material, such as wood, is attached to tube 23 to prevent liquid from entering the tube and escaping from the reservoir, regardless of the attitude of the reservoir.

A fluid tube 25 is provided for conducting fluid 22 from the reservoir to chamber 7. Tube 25 and reservoir 21 extend to a lower elevation than chamber 7, so that fluid 22 is not caused to flood the chamber by gravity. A weight 26 is attached to tube 25 to hold it within the fluid regardless of the attitude of the reservoir, so that air may not enter the tube and thus reach chamber 7. The system may thus be transported without special precaution to avoid interfering with its proper operation.

Tube 25 is branched at 27 and 30 to provide for parallel flow through a conventional check valve 28 and manual valve 29. Valve 29 is provided for draining fluid 22 from chamber 7 to the reservoir for re-instituting cell operation following flooding, and is normally closed. Check valve 28 is arranged to limit flow to the direction shown by the arrow, to prevent flow of fuel gas from chamber 7 into reservoir 22, and thus eliminates a potential fire hazard.

In operation, the fuel cell functions in the manner described by the aforementioned Grubb Patent 2,913,511, so long as air is available to chamber 9, and fuel gas is suppled to chamber 7 by generator 12 and surge tank 13 at a pressure equal to or greater than atmospheric. However, if it occurs that the pressure of the supply diminishes below atmospheric due to its exhaustion by operation of the fuel cell, non-reactant fluid is forced through tube 25 from reservoir 21 by atmospheric pressure prevailing in the reservoir. The non-reactant fluid floods chamber 7, compressing the remaining fuel gas into tank 13 until it reaches pressure equilibrium with the atmosphere. In practice, initial equilibrium will be reached before membrane 1 is completely flooded, and fuel cell operation will continue for a time. However, continued operation will reduce the fuel gas pressure further, and flooding will proceed until the membrane is completely covered by non-reactant fluid. At this point, the cell reaction ceases, flooding stops, and a final pressure equilibrium is achieved.

In order to re-institute operation of the fuel cell, screws 18 are removed to separate flanges 16 and 17, generator 12 is detached from conduit 14, and the gas-generating reactants are replenished. Valve 29 is then opened, and the generator is re-attached to conduit 14. A fuel gas pressure in tank 13 and chamber 7 increases to a super-atmospheric level, the non-reactant fluid is forced from the chamber by the gas pressure and by gravity, draining through tube 25 into reservoir 21. Operation of the fuel cell then proceeds in a normal manner.

A modified form of non-reactant fluid reservoir 32 is shown in FIG. 2, comprising an expansible bag 33 of rubber, plastic, or other deformable material. A tube 34 extends into the interior of the bag in fluid-sealing engagement, for conducting a supply of non-reactant fluid 35 to the fuel cell. It will be apparent that reservoir 32 is adapted for use with either liquid or gaseous non-reactant fluids, and that atmospheric pressure acts upon the bag as a reference pressure; in the event that a liquid non-reactant is used, the reservoir must extend to a lower elevation than chamber 7. Nitrogen and helium are examples of suitable gaseous fluids which may be used. In operation, a gaseous non-reactant fluid does not interrupt operation of the fuel cell upon flooding chamber 7, but maintains a safe pressure in the chamber, as the reaction and absorption of the fuel gas proceeds at a diminishing rate.

A further modification of the non-reactant fluid reservoir which provides a predetermined super-atmospheric reference pressure is shown in FIG. 3. A reservoir 36 is formed with an internal cylindrical bore 37 slidably receiving a piston 38. Fluid-sealing engagement is provided in a well-known manner by a conventional piston-ring 39 carried by the piston. A supply of non-reactant fluid 40, which may be a liquid or a gas, is subjected to the reference pressure by piston 38, and a tube 41 communicates with the interior of bore 37 for feeding the fluid to chamber 7. An opening 42 is formed in a wall of reservoir 36 above piston 38, in order to subject the piston to atmospheric pressure uniformly as it moves. A predetermined super-atmospheric reference pressure is applied to fluid 40 by means of a compression spring 43 interposed between piston 38 and an end wall 44 of the reservoir. Again, reservoir 36 and tube 41 must extend to a lower elevation than chamber 7. The operation of reservoir 36 is similar to that of reservoir 33 in FIG. 2, except that flooding occurs at the level predetermined by the spring constant of spring 43 and the area of piston 38; and subsequent discharge of the non-reactant fluid from chamber 7 occurs only upon the attainment of a fuel gas pressure greater than the increased reference level. Reservoir 36 may be modified to establish a sub-atmospheric reference pressure level, merely by closing opening 42, and creating a degree of vacuum in the upper portion of the reservoir such as to balance spring 43 at the desired reference pressure level.

A further embodiment of my improved fuel cell system is shown in FIG. 4 in which a surge tank and a non-reactant fluid reservoir are integrally combined in an expansible reservoir 50. The solid electrolyte fuel cell shown is similar to that shown in the system of FIG. 1, and similar parts are similarly numbered, with subscripts "a."

Reservoir 50 comprises a conventional expansible bellows of any suitable type, communicating with fuel gas conduit 6a by tube means 51. The reservoir 50 is only partially filled with a supply of non-reactant liquid 52, so that a portion of the enclosed space is available to serve as a surge tank for fuel gas accumulation. Conduit 6a connects chamber 7a with a fuel gas generator 12a and conduit 14a through a check valve 19a, limiting gas flow to the direction shown by the arrow. Removal of generator 12a for replenishment of gas-generating reactants is provided for by means of an interruption 15a in conduit 14a, and by flanges 16a and 17a, separably attached by machine screws 18a.

A drain tube 53 is provided for draining fluid 52 from chamber 7a to reservoir 50, and communicates with the reservoir at a point spaced vertically below tube means 51, and below the surface of the fluid. A conventional check valve 54 is interposed in drain tube 53 in order to limit flow to the direction shown by the arrow, so that fluid 52 is not admitted to chamber 7a during normal operation of the fuel cell, that is, when bellows 50 is distended by fuel gas pressure. Reservoir 50 and tube 53 must extend to a lower elevation than chamber 7a, to insure draining of non-reactant liquid from the chamber.

In operation, generation of fuel gas by generator 12a at a super-atmospheric pressure distends reservoir 50, filling an upper portion thereof with a reserve supply of fuel gas. Fluid 52 is confined within the reservoir by the gas pressure, and by check valve 54, during normal operation of the fuel cell. However, if it occurs that the pressure of the supply diminishes below atmospheric pressure due to its exhaustion by operation of the fuel cell, bellows 50 is forced by atmospheric pressure to contract, thus forcing fluid 52 through tube means 51 and conduit 6a into chamber 7a. Fuel gas remaining in the chamber rises into conduit 6a and is compressed to atmospheric pressure, at which point chamber 7a is flooded, fuel cell operation ceases, and an equilibrium condition is reached.

The supply of gas-generating reactants may be replenished in the same manner as in the system of FIG. 1. Upon the generation of a new supply of fuel gas at a super-atmospheric pressure, reservoir 50 is distended, and non-reactant fluid is forced from chamber 7a through drain tube 53 and check valve 54, until the equilibrium condition illustrated in FIG. 4 is achieved. Normal operation of the fuel cell is thereupon automatically re-instituted.

Another embodiment of my improved fuel cell system is shown in FIG. 5, in which a non-reactant liquid is subjected to the differential pressure of the fuel and oxidant chambers, the higher of the chamber pressures serving as a reference level. The solid electrolyte fuel cell shown is again similar to that shown in the system of FIG. 1, and similar parts are similarly numbered, with subscripts "b."

A non-reactant liquid reservoir 59 having a flexible diaphragm 60 is provided in this system, forming compartments 61 and 62 which have no fluid communication, but mutually transmit pressure through the diaphragm. Compartment 61 communicates with chamber 7b through a fluid supply tube 63, and compartment 62 similarly communicates with chamber 9b through a fluid supply tube 64. A supply of any suitable non-reactant liquid 65 fills compartments 61 and 62. Reservoir 59 and tubes 63 and 64 extend to a lower elevation than chambers 7b and 9b, to provide proper drainage of non-reactant liquid from the fuel cell. In order to drain off excess water which forms in chamber 9b as a product of reaction of the fuel cell, a valved outlet 66 of chamber 9b is provided with an accumulating trap 67. Tubes 63 and 64 are preferably filled with non-reactant liquid to the levels at which they join valved outlets 10b and 66, respectively, and any excess liquid is drained through the outlets. Oxidant supply conduit 8b is provided with a conventional check valve 68, limiting flow to the direction shown by the arrow, to prevent the escape of fluid 65.

Upon the occurrence of a pressure differential between chambers 7b and 9b, whether caused by a difference in normal supply pressure or by the depletion of one of the reacted gas supplies, diaphragm 60 will be distorted in a direction to eliminate the differential, compressing the lower pressure gas through the medium of liquid 65. If the gas pressures are stable, an equilibrium condition will be reached when the difference in pressure head of the liquid in tubes 63 and 64, together with the spring loading diaphragm 60, is in balance with the gas pressure differential.

A moderate pressure differential between chambers 7b and 9b may be desired, to accommodate specific fuel and oxidant gas supplies. The physical dimensions of the system and the spring constant of diaphragm 60 are selected with reference to the desired relative operating pressures of the fuel and oxidant gas supplies, such that the displacement of liquid 65 will not be great enough to flood either chamber under a desired operating pressure differential. However, in the event that one of the gas supplies becomes depleted and exhibits a continuing decrease in pressure, fluid 65 will continue to be displaced until it floods and substantially fills the corresponding chamber. Operation of the fuel cell is then fully interrupted, and no further decrease in gas pressure occurs. Operation may be subsequently re-instituted in the same manner as has previously been described for the system shown in FIG. 1.

Still a further embodiment of the fuel cell system is shown in FIG. 6, in which a pressurized non-reactant gas is used to offset an excessive reactant gas pressure differential, and the higher of the reactant gas pressures serves as a reference level. The solid electrolyte fuel cell is similar to that shown in the system of FIG. 1, and similar parts are similarly numbered, with subscripts "c." Oxidant supply conduit 8c is provided with a conventional check valve 69, limiting flow to the direction shown by the arrow, to prevent escape of fluid from chamber 9c.

Means for sensing differential pressure between fuel cell chambers 7c and 9c are provided, comprising an expansible diaphragm 70 mounted in a cylinder 71 to form compartments 72 and 73, which have no fluid communication but which mutually transmit pressure through the diaphragm. Compartments 72 and 73 communicate with chambers 7c and 9c through supply tubes 74 and 75 and branch tubes 76 and 77, respectively.

A supply of any suitable non-reactant gas is contained in a pressurized reservoir 78. A distributing valve generally designated 79 is provided for controlling the supply of the non-reactant gas to the fuel cell in response to the pressure differential sensed by bellows 70. Valve 79 comprises a valve body 80 received within a cylindrical housing 81, formed with pressure-relief openings 82 and 83 at opposite ends thereof. Reservoir 78 communicates with a central portion of the interior of housing 81 by means of a tube 84, and supply tubes 74 and 75 communicate with the interior of the housing near opposite ends thereof. Valve body 80 is formed with a stem 85 secured to diaphragm 70, and with enlarged cylindrical portions 86 and 87 slidably received in fluid-sealing relation within housing 81. Portions 86 and 87 are so spaced apart as to close communication to tubes 74 and 75, respectively, in the neutral position shown, in which little or no pressure differential exists upon diaphragm 70. The physical dimensions of the system and the spring constant of diaphragm 70 are selected so that a normal operating pressure differential, within the bursting strength of membrane 1c, will not move valve body 80 sufficiently to open either of tubes 74 or 75 to the non-reactant fluid.

In the event that the reactant gas pressure in either of fuel cell chambers 7c or 9c decreases due to the depletion of the reactant gas supply thereto, such that the differential pressure increases beyond the operating limit predetermined by the geometry of the system, diaphragm 70 and body 80 are deflected in a direction to open a corresponding one of tubes 74 or 75, establishing its communication with reservoir 78 through housing 81. Non-reactant gas flows into the fuel cell chamber exhibiting the lower pressure, and increases the pressure therein until diaphragm 70 recloses valve 79. The pressure differential is then reduced to the predetermined operating level. Further depletion will cause a repetition of this cycle until the supply of reactant gas is substantially exhausted; thereupon, fuel cell operation is fully terminated, and an equilibrium condition is reached at which a pressure differential within the predetermined operating limit is maintained. To reinstitute operation, the reactant gas supply is replenished, and valve 10c or 11c is opened to purge the non-reactant gas from the fuel cell.

It will be seen from the foregoing description that I have an improved fuel cell system having means for preventing an excessive pressure differential from developing on opposite sides of an ion exchange membrane, thus eliminating the danger of bursting of the membrane by differential pressures of the fuel and oxidant gases used as reactants in the fuel cell. The systems described provide for the use of any desired reference pressure level, including but not limited to atmospheric pressure or the higher of the reactant gas pressures, to control the discharge of non-reactant fluid from a reservoir into a fuel cell chamber to achieve the purposes of the invention. The selection of the reference pressure level may provide for a desired differential in operating pressure of the fuel and oxidant gases, but is chosen to limit the maximum pressure differential to a value less than the bursting strength of the ion-exchange membrane.

It will be apparent to those skilled in the art that many changes and modifications may be made without departing from the spirit and scope of my invention. For example, a reservoir of non-reactant fluid may be connected to the oxidant gas chamber as well as the fuel gas chamber in systems utilizing a source of oxidant other than atmospheric air, to prevent the occurrence of low pressure in the oxidant chamber and consequent bursting of the membrane. Furthermore, various well-known types of reservoirs, gas supplies, and valves may be substituted as equivalents to those shown and described. Also, various well-known liquid or gaseous non-reactant fluids may be used in appropriate embodiments of my improved system. I intend in the appended claims to cover all such changes and modifications.

What I claim as new and desire to secure by Letters Patent of the United States is:

1. A fuel cell system comprising, in combination; a fuel cell comprising a pair of electrodes, an electrolyte membrane positioned between and in contact with said electrodes, and means forming a pair of chambers each enclosing one of said pair of electrodes, means for supplying fuel and oxidant reactant gases to said chambers, respectively; and means responsive to a reference pressure constructed and arranged to flood one of said chambers with a non-reactant fluid upon the pressure of the reactant gas in said one chamber decreasing to a value less than said reference pressure.

2. A fuel cell system as recited in claim 1, in which said last-mentioned means comprise a reservoir communicating with at least one of said chambers, said reservoir comprising means for containing a supply of non-reactant fluid and for subjecting the non-reactant fluid to said reference pressure.

3. A fuel cell system as recited in claim 1, in which said last-mentioned means comprise a reservoir adapted to contain a non-reactant fluid under pressure, tube means for communicating said reservoir with at least one of said chambers, and valve means responsive to a differential between the pressure in said one of said chambers and the pressure in the other of said chambers as a reference pressure, said valve means constructed and arranged to communicate said reservoir with said tube means upon the pressure in said one of said chambers decreasing to a value less than said reference pressure.

4. A fuel cell system comprising, in combination: a fuel cell comprising a pair of electrodes, an electrolyte membrane positioned between and in contact with said electrodes, and means forming a pair of chambers each enclosing one of said pair of electrodes; means for supplying fuel and oxidant reactant gases to said chambers, respectively; a reservoir adapted to contain a supply of non-reactant fluid, said reservoir constructed and arranged to apply a reference level pressure to the non-reactant fluid; and tube means communicating said reservoir with at least one of said chambers, such that the non-reactant fluid supply is subjected to the differential in pressure between the reactant gas in said one of said chambers and said reference level pressure, whereby said one of said chambers is flooded with non-reactant fluid upon the reactant gas therein depleting to a pressure less than the reference level.

5. A fuel cell system as recited in claim 4, in which said tube means and said reservoir extend to a lower elevation than said one of said chambers and said reservoir is adapted to contain a liquid non-reactant fluid.

6. A fuel cell system as recited in claim 4, in which said reservoir is expansible for subjection to ambient pressure as a reference level and to receive a reserve supply of one of said reactant gases, and said reservoir is adapted to contain a liquid non-reactant fluid; together with a drain tube communicating said one of said chambers with said reservoir at a lower elevation than the communication of said tube means with said reservoir, and a check valve in said drain tube, said check valve being operative to limit flow in said drain tube to a direction from said one of said chambers toward said reservoir.

7. A fuel cell system as recited in claim 4, said reservoir comprising means forming a pair of mutually fluid-sealed pressure-transmitting expansible compartments, said tube means comprising a pair of tubes each communicating one of said compartments with one of said chambers, said compartments adapted to contain a liquid non-reactant fluid, said tube means and said reservoir extending to a lower elevation than said chambers, whereby the differential in pressure of the reactant gases in said chambers is applied to the non-reactant liquid.

8. A fuel cell system comprising, in combination: a fuel cell comprising a pair of electrodes, an electrolyte membrane positioned between and in contact with said electrodes, and means forming a pair of chambers each enclosing one of said pair of electrodes; means for supplying fuel and oxidant reactant gases to said chambers, respectively; a reservoir adapted to contain a supply of non-reactant fluid under pressure; first and second tube means each communicating with one of said chambers; a distributing valve constructed and arranged for selectively communicating said reservoir with said tube means individually; and pressure-responsive means drivingly connected with said distributing valve for movement in response to a differential in pressure between the reactant gases in said chambers in excess of a predetermined limit to supply non-reactant fluid to that one of said chambers exhibiting the lower pressure and thereby reduce the differential in pressure below the predetermined limit.

References Cited in the file of this patent

UNITED STATES PATENTS

| | | |
|---|---|---|
| 2,384,463 | Gunn et al. | Sept. 11, 1945 |
| 2,912,478 | Justi et al. | Nov. 10, 1959 |
| 2,913,511 | Grubb | Nov. 17, 1959 |
| 2,921,110 | Crawley et al. | Jan. 12, 1960 |